(12) United States Patent
Mueller-Fiedler et al.

(10) Patent No.: US 6,295,158 B1
(45) Date of Patent: Sep. 25, 2001

(54) THERMOOPTICAL MODULATOR

(75) Inventors: Roland Mueller-Fiedler, Leonberg; Winfried Bernhard, Gerlingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/556,553

(22) Filed: Apr. 24, 2000

(30) Foreign Application Priority Data

May 20, 1999 (DE) .............................................. 199 23 061

(51) Int. Cl.[7] .............................. G02F 1/01; G02F 1/03; G02F 1/00; G02F 1/035; G02F 1/295
(52) U.S. Cl. ........................ 359/288; 359/245; 359/237; 385/1; 385/2; 385/8
(58) Field of Search .................................... 359/245, 237, 359/288, 321, 322, 326, 332, 254, 263; 343/772, 786; 250/214.1; 385/1, 2, 8, 9, 14, 15, 16, 22, 23, 116

(56) References Cited

U.S. PATENT DOCUMENTS

| | | | |
|---|---|---|---|
| 4,270,847 | * 6/1981 | Meyer | 359/254 |
| 5,009,483 | * 4/1991 | Rockwell, III | 385/116 |
| 5,657,148 | * 8/1997 | Feuer | 359/263 |

OTHER PUBLICATIONS

"Cross Reduction in Switching Network by Asymmetrical On–off Switches" by W. Bernhard et al, in Photo West–Optoelectronics 99, Jan. 25, 1999, San Jose CA, USA.

* cited by examiner

*Primary Examiner*—Georgia Epps
*Assistant Examiner*—Gary O'Neill
(74) *Attorney, Agent, or Firm*—Michael J. Striker

(57) ABSTRACT

The thermooptic modulator includes a wave guide (1) having a switching section (4), a refracting section (5) bordering the switching section (4) and extending transversely to a signal propagation direction (14) in the wave guide and a first heating element (8) extending on the refracting section (5) along a boundary (6) between the wave guide (1) and the refracting section (5). In order to improve signal suppression when the modulator is switched to an impermable state, a second heating element (9) is provided extending on the wave guide (1) along the boundary (6).

8 Claims, 1 Drawing Sheet

THERMOOPTICAL MODULATOR

BACKGROUND OF THE INVENTION

The present invention relates to a thermooptical modulator with a wave guide having a switching section, a refracting section bordering the switching section and extending transversely to the signal propagation direction in the wave guide and a first heating element extending in the refracting section along its boundary with the wave guide. A thermooptical modulator of this type was disclosed at the conference entitled "Photonics West-Optoelectronics 99" on Jan. 25, 1999 in San Jose, Calif., U.S.A. by W. Bernhard, R. Müller-Fiedler, T. Pertsch and C. Wächter. This lecture was reported after that in the Proceedings SPIE Volume 3620.

This known modulator is based on the following principle of operation. A wave guide mode is guided in a signal propagation direction to the boundary of a wave guide through total reflection. There, where the wave guide borders the refracting section, a total reflection occurs, at least on one side of the wave guide; the mode propagates in the refracting section; and no noteworthy light intensity emerges into the section of the wave guide, where it separates again from the refracting section. In its resting state this type of structure is practically impenetrable for the mode.

In order to be able to modulate the intensity of the light passing through the structure, a heating element is provided along the boundary between the wave guide and the refracting section. If this refracting section is heated in the vicinity of the boundary, the refractive index of this section is decreased, so that the mode propagates in the wave guide, also in the refracting section, and passes through the modulator without a reduction in intensity or with little intensity reduction. The transmission of the structure may thus be controlled in a simple way by turning the heating element on and off.

Polymeric material having a noteworthy or marked thermooptic effect can be used as the material for the wave guide and the bending section. A thermooptic effect means that its index of refraction changes significantly with changing temperature.

However these polymeric materials do not completely relax into their initial state after their temperature is returned to its initial value after a temperature change so that a small residual index of refraction change remains even after the temperature is returned to its initial value. Because of this residual index of refraction change a portion of the light passes through the modulator, even when the heating element is turned off. For engineering applications, especially with integrated optical circuits for optical telecommunications networks, however a rapid and complete suppression of the signal to be modulated and a rapid and complete shut off of the modulator are required.

SUMMARY OF THE INVENTION

It is an object of the present invention to provide a thermooptical modulator of the above-described type that does not suffer from the above-described disadvantage.

It is another object of the present invention to provide a thermooptical modulator of the above-described type that has a reproducible and rapid switching time between a state in which it is completely conducting and another state in which it is completely non-conducting.

These objects, and others, which will be made more apparent hereinafter, are attained in a thermooptical modulator with a wave guide having a switching section, a refracting section bordering the switching section and extending transversely to the signal propagation direction in the wave guide and a first heating element extending on the refracting section along its boundary with the wave guide.

According to the invention a second heating element is provided in addition to the first heating element and this second heating element extends on the wave guide along the boundary.

A thermooptical modulator is provided by the invention, which can be switched from a practically completely permeable state so that it is practically completely impenetrable in the shortest possible time. For this purpose a second heating element is provided, which extends along the boundary of the refracting section on the wave guide. When the modulator is switched from a penetrable to an impenetrable state, the first heating element is turned off in the usual manner, so that the boundary of the refracting section cools and its refractive index decreases approximately to that of the wave guide bordering it. The original value of the refractive index is however not exactly reached again by the cooling. In order to perform a complete adjustment or matching in the shortest possible time, the second heating element can be turned on, which heats the wave guide at least in its switching section bordering the refracting section. This leads to a reduction of the index of refraction of the wave guide in the switching section. As soon as the index of refraction reaches that of the adjacent portion of the refracting section or exceeds it, light can again pass substantially unhindered into the refracting section and the modulator is again impenetrable.

According to a preferred embodiment the first heating element extends transversely to the signal propagation direction only over a part of the width of the refracting section. When the first heating element is put into operation in this modulator and the second heating element compensates for the index of refraction difference at the boundary between the wave guide and the index of refraction section, a transition zone arises on the side of the first heating element facing the wave guide, in which the index of refraction changes so that light scattered from the wave guide into the index of refraction section is then directed back toward it. In order to avoid this a third heating element is provided appropriately on the side of the first heating element facing away from the second heating element, which can be operated in order to compensate for the refraction index difference in this transitional region and to avoid reflection at this boundary zone.

The modulator appropriately includes an additional driver circuit which receives signals for turning on and turning off the modulator and provides the heating element with energy in a suitable manner.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
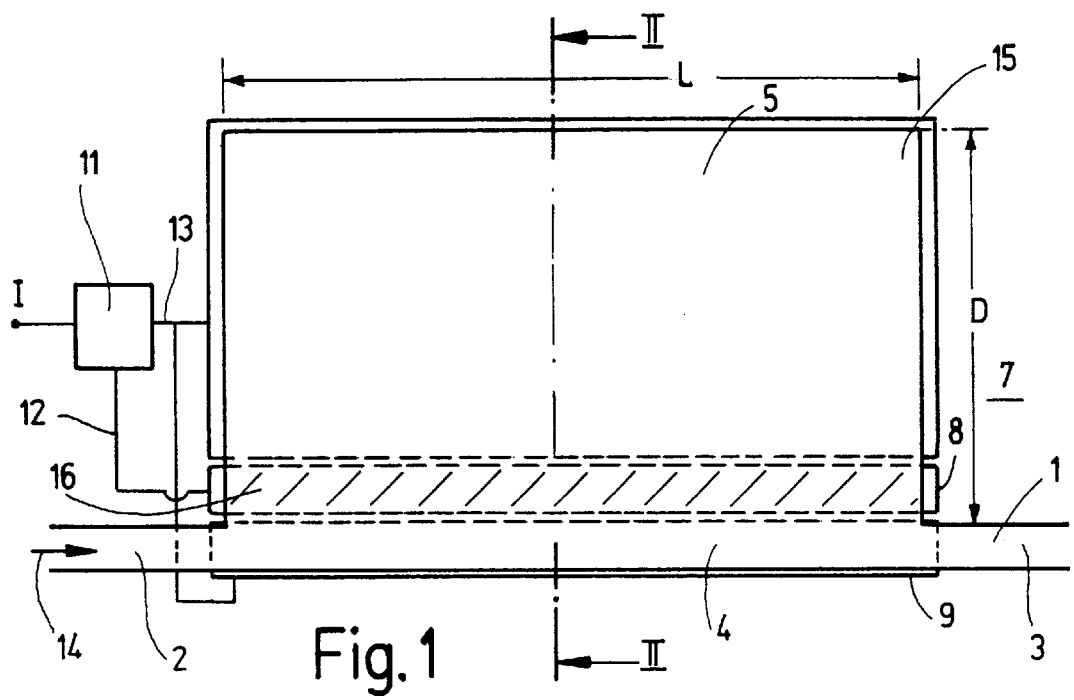
FIG. 1 is a plan view of a thermooptical modulator according to the invention from below.
Figure 2:
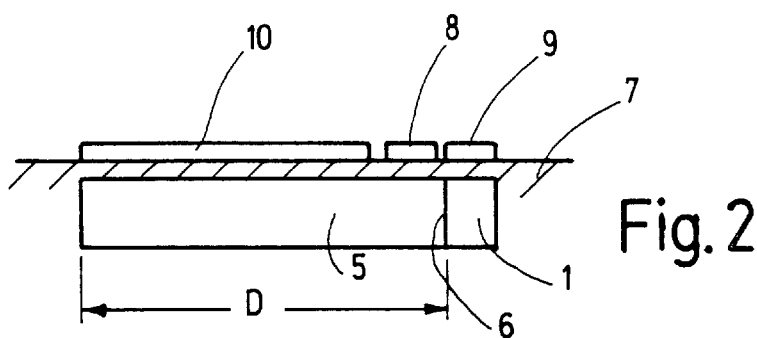
FIG. 2 is a cross-sectional view through the thermooptical modulator of FIG. 1 taken along the section line II—II of FIG. 1.

The thermooptical modulator shown in FIG. 1 includes a planar wave guide 1 with an entrance section 2, an outlet section 3 and a switching section 4 located between the entrance section and outlet section. A refracting section 5 extends laterally from the switching section 4 (see FIG. 1) and along a boundary 6 aligned with the edges of the entrance and outlet sections 2,3 (See FIG. 2).

The wave guide 1 and the refracting section 5 are made from a material with a uniform index of refraction $n_1$ and embedded in a substrate material 7 that has a different index of refraction $n_2$.

A first and second heating element 8,9 extend on both sides of the boundary 6 over a portion of the width of the refracting section 5 and over the switching section 4 of the wave guide 1 respectively. The remaining surface of the switching section 5 on the side of the first heating element 8 facing away from the wave guide 1 is covered by a third heating element 10. This third heating element can be produced on the surface of the substrate 7 in a known manner, for example by vapor deposition or screen printing. A driver circuit 11 has an input for a control signal I, which determines whether the modulator should be permeable or impermeable to light. The driver circuit provides the heating elements 8,9,10 with current through the respective conductors 12,13 according to the desired operation state.

The width of the wave guide 1 and the first and second heating elements 8,9 parallel to the substrate upper surface is at least approximately equal to the thickness of the wave guide 1 and the refracting section 5 perpendicular to that. The width may not be substantially smaller than this thickness, since otherwise inhomogeneities of the temperature of the sections 4,5 impair the switching behavior of the modulator.

Figure 3:
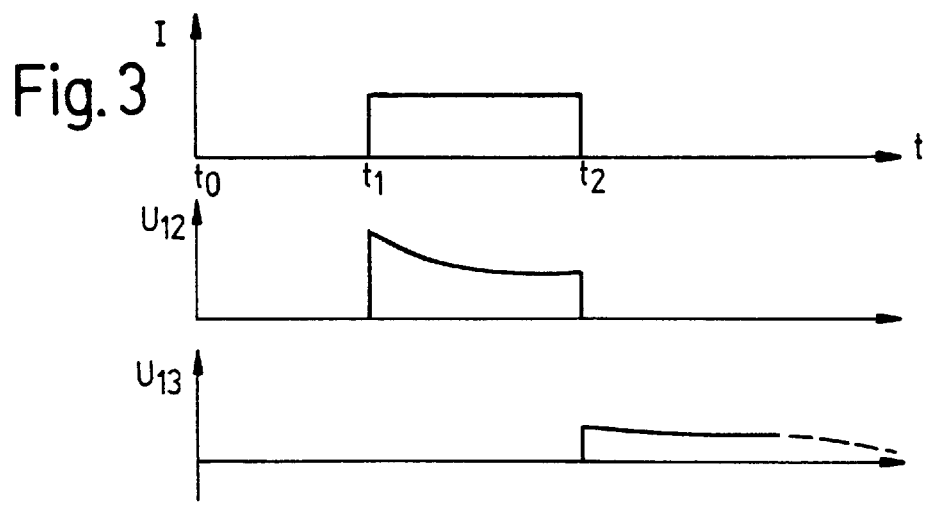
FIG. 3 is a graphical illustration showing the time evolution of a control signal and heating element voltages of the modulator.

FIG. 3 shows different phases of operation of the modulator. In a first phase the control signal I has the value 0 between the time points $t_0$ and $t_1$ and the modulator should be impenetrable. The indices of refraction of the sections 2 to 5 of the modulator are equal. A mode guided in the direction of the arrow 14 from the entrance section 2 of the wave guide thus enters the switching section 4, starts to be refracted into the refracting section 5, and divides itself. The length L and width D of the refracting section 5 can be selected, for example, in recognition of the guided mode, so that it propagates in the refracting section 5 in accordance with its center of gravity in the direction of the opposite corner 15 diagonal to the entrance section 2. Thus an effective damping of the mode on the order of 35 dB is obtained.

At the time point t, the signal I has a non-vanishing size, which results in the switching of the modulator into its conducting or permeable state. The driver circuit provides a supply voltage $U_{12}$ for the first heating element on conductor 12. The course of this supply voltage is shown in FIG. 3. This supply voltage $U_{12}$ can have a constant value with a simple shape or it can have a comparatively high value at time point $t_1$ which permits a rapid heating of the boundary region 16 of the refracting section 5 below the first heating element 8 to a desired working temperature and which subsequently decays to a holding value, which is sufficient to maintain the boundary region at the working temperature.

The heating of the boundary region 16 leads to a decrease of its index of refraction and thus to total reflection of the mode conducted along the boundary 6. The light reaches the outlet section 3 essentially without attenuation.

At the time point $t_2$ the signal returns to the value 0. The driver circuit 11 ceases to provide the heating element 8 with current. The boundary section under the first heating element 8 cools rapidly by diffusion of heat into the substrate material 7, its index of refraction remains still slightly less than that of the switching section 4. In order to present a comparatively larger amount of light reaching the outlet section 3 because of residual reflection at the boundary 6, the driver circuit 11 now provides the second heating element 9 with a heating voltage $U_{13}$. The resulting heating of the switching section 4 reduces its index of refraction so that it is substantially equal to that of the boundary region 16 under the first heating element 8. Light supplied to the entrance section 2 is thus no longer guided along the boundary 6 and can be deflected into the refracting section 5 without hindrance.

The heating voltage $U_{13}$ is maintained, as needed at a progressively decreasing level, until the index of refraction of the boundary region has again reached a stationary value.

In order to avoid a second discontinuity of the index of refraction on the side of the boundary region 16 facing away from the switching section 4, the third heating element 10 is similar provided with the voltage $U_{13}$. Thus a substantially uniform index of refraction, which is of course slightly smaller than during the time interval between $t_0$ and $t_1$, results throughout the entire width of the switching section 4 and the refracting section 5. However this feature permits an effective scattering of light in the refracting section 5 and thus an effective suppression of light transmission through the modulator.

A different embodiment can avoid inclusion of the third heating element, when the first heating element 8 instead extends over the entire surface of the refracting section 5.

The disclosure in German Patent Application 199 23 061.7 of May 20, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a thermooptical modulator, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A thermooptical modulator comprising
    a wave guide (1) having a switching section (4),
    a refracting section (5) bordering the switching section (4) and extending transversely to a signal propagation direction (14) in the wave guide,
    a first heating element (8) extending on the refracting section (5) along a boundary (6) between the wave guide (1) and the refracting section (5), and
    a second heating element (9) extending on the wave guide (1) along the boundary (6).

2. The thermooptical modulator as defined in claim 1, wherein the first heating element (8) extends over a portion of a width (D) of the refracting section (5) transversely to said signal propagation direction (14) and a third heating element (10) is arranged adjacent to a side of the first heating element (8) facing away from the second heating element (9).

3. The thermooptical modulator as defined in claim 1, further comprising a driver circuit (11) including means for turning on the first heating element (8) on receipt of a first signal (I) for turning on the thermooptical modulator and means for turning off the first heating element (10) and turning on the second heating element (9) on receipt of another signal (I) for shutting off the thermooptic modulator.

4. The thermooptical modulator as defined in claim 2, further comprising a driver circuit (11) including means for turning on the first heating element (8) on receipt of a first signal (I) for turning on the thermooptical modulator and means for turning off the first heating element (10) and turning on the second heating element (9) and the third heating element (10) on receipt of another signal (I) for shutting off the thermooptic modulator.

5. The thermooptical modulator as defined in claim 3, wherein the driver circuit (11) keeps the second heating element (9) in operation only for a predetermined time interval.

6. The thermooptical modulator as defined in claim 4, wherein the driver circuit (11) keeps the second heating element (9) and the third heating element (10) in operation only for a predetermined time interval.

7. The thermooptical modulator as defined in claim 5, wherein the second heating element (9) has a lower operating temperature than that of said first heating element (8).

8. The thermooptical modulator as defined in claim 6, wherein the second heating element (9) and the third heating element (10) each have a lower operating temperature than that of said first heating element (8).

* * * * *